US011906959B2

(12) United States Patent
Raje

(10) Patent No.: US 11,906,959 B2
(45) Date of Patent: Feb. 20, 2024

(54) OFF THE ROAD TIRE MAINTENANCE USING MACHINE LEARNING

(71) Applicant: BRIDGESTONE AMERICAS TIRE OPERATIONS, LLC, Nashville, TN (US)

(72) Inventor: Renuka N. Raje, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/713,826

(22) Filed: Apr. 5, 2022

(65) Prior Publication Data

US 2022/0326703 A1 Oct. 13, 2022

Related U.S. Application Data

(60) Provisional application No. 63/171,810, filed on Apr. 7, 2021.

(51) Int. Cl.
*G05B 23/02* (2006.01)
*B60C 23/04* (2006.01)
*B60C 23/20* (2006.01)

(52) U.S. Cl.
CPC ...... *G05B 23/0283* (2013.01); *B60C 23/0479* (2013.01); *B60C 23/0481* (2013.01);
(Continued)

(58) Field of Classification Search
CPC .............. G05B 23/0283; G05B 23/024; B60C 23/0479; B60C 23/0481; B60C 23/20
See application file for complete search history.

(56) References Cited

U.S. PATENT DOCUMENTS

| 2013/0018575 A1 | 1/2013 | Birken et al. |
| 2015/0029016 A1* | 1/2015 | Lesesky .............. B60C 23/0479 340/442 |

(Continued)

FOREIGN PATENT DOCUMENTS

| EP | 1 000 776 B1 | 5/2004 | |
| WO | WO9202865 A1 * | 7/1991 | ............... G06N 3/08 |

(Continued)

OTHER PUBLICATIONS

Boyraz, P., et al., "Intelligent traction control in electric vehicles using an acoustic approach for online estimation of road-tire friction," 2013 IEEE Intelligent Vehicles Symposium (IV), pp. 1336-1343 (Abstract).

*Primary Examiner* — Mischita L Henson

(57) ABSTRACT

Systems and methods of for tire maintenance using machine learning are provided. The system receives one or more values comprising sensor data and a unique identifier associated with the tire. The system can retrieve historical inspection data associated with the unique identifier of the tire. The system can generate a matrix comprising a first dimension based on timestamps and a second dimension based on the one or more values and the historical inspection data. The system can predict, via input of the matrix into a machine learning model constructed, an output matrix comprising an indication to perform a type of maintenance and at least one tire maintenance category. The system can provide the indication to perform the type of maintenance for the tire during the time interval and the at least one tire maintenance category.

18 Claims, 5 Drawing Sheets

(52) U.S. Cl.
 CPC ............ *B60C 23/20* (2013.01); *G05B 23/024* (2013.01); *B60C 2200/14* (2013.01)

(56) References Cited

U.S. PATENT DOCUMENTS

| | | | |
|---|---|---|---|
| 2016/0121668 A1 | 5/2016 | Singh | |
| 2016/0323659 A1* | 11/2016 | Singh | ................. B60C 23/0479 |
| 2019/0041835 A1* | 2/2019 | Cella | ........................ G06N 3/02 |
| 2020/0070906 A1 | 3/2020 | Laperle et al. | |
| 2021/0049445 A1* | 2/2021 | Bielby | ................... G06N 3/049 |
| 2021/0072033 A1* | 3/2021 | Husain | .................... G06Q 50/30 |
| 2021/0173399 A1 | 6/2021 | Richard et al. | |
| 2022/0185032 A1* | 6/2022 | Choi | ..................... B60C 11/246 |

FOREIGN PATENT DOCUMENTS

| | | | |
|---|---|---|---|
| WO | WO-2005113261 A1 * | 12/2005 | ........... B60C 23/009 |
| WO | WO-2018/007330 A1 | 1/2018 | |
| WO | WO-2020/041899 | 3/2020 | |
| WO | WO-2020/198451 A1 | 10/2020 | |

\* cited by examiner

OFF THE ROAD TIRE MAINTENANCE USING MACHINE LEARNING

CROSS-REFERENCE TO RELATED APPLICATION

This application claims the benefit of and priority to U.S. Provisional Application No. 63/171,810, filed Apr. 7, 2021, which is incorporated herein by reference in its entirety.

BACKGROUND

Tires on vehicles are susceptible to premature damage or failure if not properly maintained. However, due to various environmental conditions under which tires can be used, it can be challenging to determine how or when to provide maintenance for a particular tire.

SUMMARY

This technical solution is directed to systems and methods for tire maintenance. The systems and methods can use a machine learning engine to indicate a tire to maintain, such as mending, replacing, or otherwise inspecting the tire of a vehicle. The systems and methods can compare data of the tire to historical data from other tires to determine if the tire should be serviced or at least a type of maintenance to perform on the tire. For example, a vehicle can be equipped with tires. Each tire on a vehicle can be assigned or associated with a unique identifier that is unique to the tire. The unique identifier can be used to track the tire as the tire is moved from one position to another on the vehicle, as well as from one vehicle to another vehicle. The vehicle can also include sensors. One or more sensors can be coupled to the vehicle or the tires. In some cases, the sensors can be fixedly coupled to the vehicle such that they do not move with the tires as the tires are moved from one position to another on the vehicle or one vehicle to another. In some cases, one or more sensors can be coupled to the tire or otherwise move with the tire as the tire position is changed or the tire is moved from one vehicle to another. The unique identifier can be embedded on the tire using a radio-frequency identifier ("RFID"), a bar code, a serial number, among other tokens to uniquely identify each tire. The unique identifier can be stored in a data repository storing unique identifiers for all registered tires. The history of the tire can be retrieved using the unique identifier corresponding to the tire. The sensor data and the history of the tire (e.g., inspection data of the tire) can be compared to inspection data or condition data of other tires to the current condition of the tire and predict when the tire should be serviced. However, due to the lack of data and history associated with each tire, it can be challenging to determine the condition of the tire in use, moreover, when to conduct maintenance on the tire. Hence, the technical solution herein provides systems and methods to determine a maintenance category for the tire, a type of maintenance to perform on the tire, and a time interval to perform the maintenance on the tire, thereby improving inventory management of the tires, the longevity of the tires, operation efficiency, and budgetary decisions influenced by tire maintenance.

Systems and methods of this technical solution can determine a maintenance category for the tire, determine a type of maintenance to perform on the tire, and predict a time interval to perform the maintenance on the tire. The technical solution can improve inventory management of the tires, the longevity of the tires, operation efficiency, and budgetary decisions influenced by tire maintenance. The technical solution can further reduce operating costs associated with damage to the tire due to overutilization and improve the operability of the vehicles by reducing downtime to replace a damaged tire.

At least one aspect is directed to systems for off the road tire maintenance. The systems can include a data processing system. The data processing system can include one or more processors and memory. The data processing system can receive, via one or more sensors of a tire, one or more values comprising sensor data and a unique identifier associated with the tire equipped on a vehicle, the sensor data comprising pressure data and temperature data. The data processing system can retrieve, from a tire data structure, historical inspection data associated with the unique identifier of the tire. The data processing system can generate a matrix comprising a first dimension based on timestamps and a second dimension based on the one or more values and the historical inspection data. The data processing system can predict, via input of the matrix into a machine learning model constructed to output condition data of the tire, an output matrix comprising an indication to perform a type of maintenance for the tire during a time interval and at least one tire maintenance category. The data processing system can provide, responsive to the prediction, the indication to perform the type of maintenance for the tire during the time interval and the at least one tire maintenance category.

The data processing system can train, via a machine learning engine, the machine learning model using historical sensor data and other historical inspection data of a plurality of tires to predict the output matrix. The historical inspection data can be first historical inspection data. The data processing system can retrieve, from the tire data structure, second historical inspection data of a plurality of tires comprising condition data of the plurality of tires, a plurality of tire maintenance categories, and a plurality of types of maintenance performed for the plurality of tires. The data processing system can compare the first historical inspection data of the tire to the second historical inspection data of the plurality of tires. The data processing system can input, based on the comparison, a subset of the second historical inspection data corresponding to the historical inspection data into the machine learning model to output the condition data of the tire. The second historical inspection data can include one or more thresholds associated with the plurality of tire maintenance categories. The data processing system can compare the one or more values of the tire to the one or more thresholds. The data processing system can determine, based on the comparison between the one or more values and the one or more thresholds and the comparison between the first historical inspection data and the second historical inspection data, the condition data of the tire and the at least one tire maintenance category.

The data processing system can link the one or more values comprising the sensor data to the unique identifier associated with the tire. The data processing system can store, to the tire data structure responsive to linking the sensor data to the unique identifier, an association between the one or more values and the unique identifier. The data processing system can receive, from a remote computing device, the historical inspection data via an inspection on the tire. The data processing system can store, in the tire data structure, an association between the historical inspection data and the unique identifier associated with the tire.

The at least one tire maintenance category can include at least one of worn out category, impact damage category, or durability category for performing the type of maintenance for the tire. The historical inspection data can include location data, tire position data, tire structure data, and appearance data. The sensor data can include mechanical data and load data of the tire. The mechanical data can include rotation data of the tire. The load data can include the pressure data and compression data of the tire. The location data can include a first coordinate and a second coordinate of the tire on a map. The tire position data can include a distance from the center of a wheel to the ground and a position equipped on the vehicle. The tire data structure can include at least the unique identifier and a plurality of timestamps associated with the unique identifier, each of the plurality of timestamps corresponding to the sensor data and the historical inspection data.

At least one aspect is directed to methods for off the road tire maintenance. The methods can be performed by a data processing system having one or more processors and memory. The methods can include the data processing system receiving, via one or more sensors of a tire, one or more values comprising sensor data and a unique identifier associated with the tire equipped on a vehicle, the sensor data comprising pressure data and temperature data. The methods can include the data processing system retrieving, from a tire data structure, historical inspection data associated with the unique identifier of the tire. The methods can include the data processing system generating a matrix comprising a first dimension based on timestamps and a second dimension based on the one or more values and the historical inspection data. The methods can include the data processing system predicting, via input of the matrix into a machine learning model constructed to output condition data of the tire, an output matrix comprising an indication to perform a type of maintenance for the tire during a time interval and at least one tire maintenance category. The methods can include the data processing system providing, responsive to the prediction, the indication to perform the type of maintenance for the tire during the time interval and the at least one tire maintenance category.

The methods can include the data processing system training, via a machine learning engine, the machine learning model using historical sensor data and other historical inspection data of a plurality of tires to predict the output matrix. The historical inspection data can be first historical inspection data. The methods can include the data processing system retrieving, from the tire data structure, second historical inspection data of a plurality of tires comprising condition data of the plurality of tires, a plurality of tire maintenance categories, and a plurality of types of maintenance performed for the plurality of tires. The methods can include the data processing system comparing the first historical inspection data of the tire to the second historical inspection data of the plurality of tires. The methods can include the data processing system inputting, based on the comparison, a subset of the second historical inspection data corresponding to the historical inspection data into the machine learning model to output the condition data of the tire. The second historical inspection data can include one or more thresholds associated with the plurality of tire maintenance categories. The methods can include the data processing system comparing the one or more values of the tire to the one or more thresholds. The methods can include the data processing system determining, based on the comparison between the one or more values and the one or more thresholds and the comparison between the first historical inspection data and the second historical inspection data, the condition data of the tire and the at least one tire maintenance category.

The methods can include the data processing system linking the one or more values comprising the sensor data to the unique identifier associated with the tire. The methods can include the data processing system storing, to the tire data structure responsive to linking the sensor data to the unique identifier, an association between the one or more values and the unique identifier. The methods can include the data processing system receiving, from a remote computing device, the historical inspection data via an inspection on the tire. The methods can include the data processing system storing, in the tire data structure, an association between the historical inspection data and the unique identifier associated with the tire.

The at least one tire maintenance category can include at least one of worn out category, impact damage category, or durability category for performing the type of maintenance for the tire. The historical inspection data can include location data, tire position data, tire structure data, and appearance data. The sensor data can include mechanical data and load data of the tire. The mechanical data can include rotation data of the tire. The load data can include the pressure data and compression data of the tire. The location data can include a first coordinate and a second coordinate of the tire on a map. The tire position data can include a distance from the center of a wheel to the ground and a position equipped on the vehicle. The tire data structure can include at least the unique identifier and a plurality of timestamps associated with the unique identifier, each of the plurality of timestamps corresponding to the sensor data and the historical inspection data.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
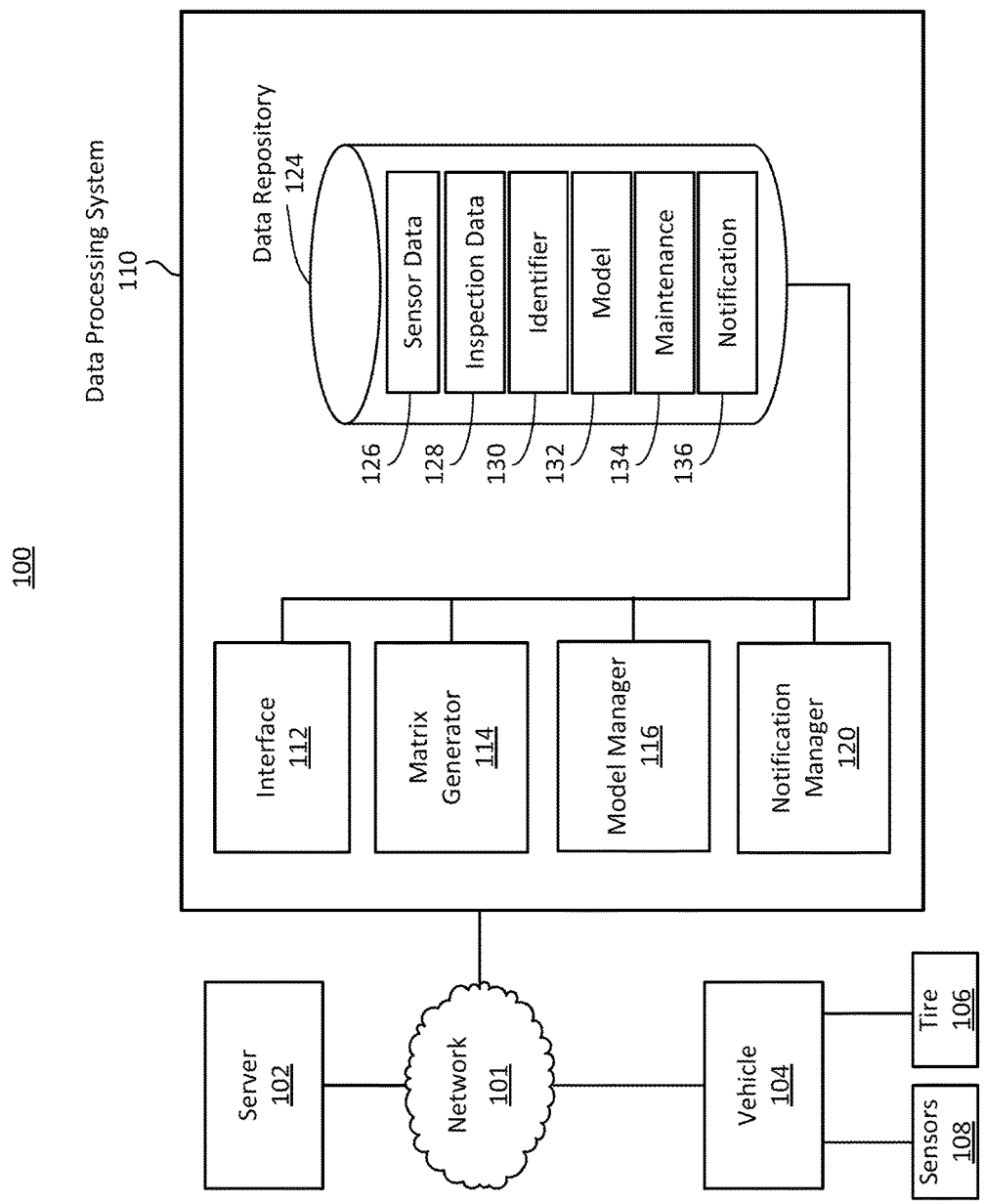
FIG. 1 depicts a block diagram depicting an example system for tire maintenance, in accordance with an embodiment.

Following below are more detailed descriptions of various concepts related to, and implementations of, methods, apparatuses, and systems to detect early removal or maintenance for off the road tires. The various concepts introduced above and discussed in greater detail below may be implemented in any of numerous ways.

This technical solution is directed to systems and methods of improving vehicle operability by early detection of off the road ("OTR") tire maintenance or removal. For example, the tires (e.g., OTR tires) can operate in varying operational environments based on the mine sites and individual quarries due to the climate, topography, and the aggregates being excavated. The tires can include sensors to track the status of the tire, including the temperature, pressure, and height of a tire. The systems and methods can include a data processing system that can process or manage the data of the tire. The data of the tire can be uploaded to a server for processing and management. The systems and methods can process mechanical data and thermal characteristics of the tire history for early detection of OTR tire maintenance by combining inspection data with operation data of the tire. The systems and methods can retrieve the tire history for each tire based on their respective unique identifier. From the early detection of OTR tire maintenance, the systems and methods can determine at least one tire maintenance category for the tire, determine a type of maintenance to perform on the tire, and predict when the maintenance should be performed.

In another example, OTR tires may not get removed due to tread wear out, unlike passenger tires. Instead, OTR tires can be removed due to damage caused by impact, burst/cut, or by separation, which can be attributed to the heat generated in the tires due to higher load, low pressure, or higher speeds. Such damage may not be detected while the tire is still in use, which can cause inoperability of the vehicle based on the severity of the damage. Hence, the systems and methods of this technical solution can detect early maintenance of OTR tires using inspection data and operational data. The systems and methods can couple the inspection data and the operation data with data science-based algorithms (e.g., Decision Trees/Neural Networks). Accordingly, the technical solution can improve inventory management, operational management, budgetary decisions, and potentially reduce the impact of unexpected events associated with tire damage.

In a further example, the technical solution can include a data processing system (or one or more processors) that can receive one or more values corresponding to sensor data from one or more sensors of a tire. The one or more values can be sensed, measured, detected, or otherwise identified by the one or more sensors embedded or installed on the tire (e.g., within the pressurized pocket between the wheel and the tire, on the wheel, or other locations near the tire). The one or more values can be received in real-time, such as during the operation of the vehicle or while the vehicle is in motion. The data processing system can retrieve inspection data (e.g., historical inspection data) of the tire. For instance, the tire can include a unique identifier, such as an RFID, barcode, identification number, or other machine-readable code to distinguish the tire from other tires. The data processing system can retrieve inspection data of the tire by hashing the unique identifier to the associated inspection data within the tire data structure. The tire data structure can include historical data of any tires registered using the unique identifier. In some cases, the data processing system can combine the sensor data with the inspection data of the tire. In some cases, the data processing system can perform initial pre-processing on the one or more values from the one or more sensors, such as prior to using the one or more values to detecting OTR tire maintenance. The pre-processing can include cleaning or filtering noises from the one or more values.

The data processing system can generate or construct a matrix based on the sensor data or the inspection data of the tire. Based on whether the sensor data or the inspection data is available, the data processing system can use individual data or a combination of both data to generate the matrix. For example, the data processing system can generate a matrix that includes the one or more values as well as the inspection data associated with the tire. The one or more values can be used to generate the matrix after an initial pre-processing, such as filtering noises generated from a vehicle in operation. The data processing system can input the matrix into a machine learning model to predict, determine, or otherwise identify an output matrix. The output matrix can include multiple dimensions based on the input matrix. The output matrix can include one or more values not included in the input matrix, such as predicted data at later time intervals. For example, the output of the machine learning model can include a type of maintenance to perform on a tire, a tire maintenance category, and a time interval to perform the maintenance. The output can indicate a probability of tire maintenance category classification, such as a class value from 0 to 1. In this case, a lower value can indicate that the data samples (e.g., input matrix) belong to a tire maintenance category while a higher value (e.g., closer to 1) can indicate that the data samples are randomly distributed between different tire maintenance categories. In some cases, the output can provide two or more tire maintenance categories of the tire indicating two or more types of maintenance recommended for the tire at a time interval. Based on the prediction, the data processing system can notify an operator to perform the type of maintenance on the tire and at least one tire maintenance category detected by the machine learning model. The data processing system can notify the operator via a display device on the vehicle equipped with the tire. The data processing system can notify the inspector during an inspection of the vehicle or the tires. Thus, the technical solution can detect early removal or maintenance of OTR tires.

FIG. 1 depicts a block diagram depicting an example system for tire maintenance. The system 100 can include a vehicle 104 (or multiple vehicles) connected to the network 101. The vehicle 104 can be a commercial vehicle (e.g., an off-road vehicle for mine operations) or a residential vehicle. The vehicle 104 can be equipped with different tires (e.g., tire 106), such as OTR tires, all-season tires, all-terrain tires, or trail tires. The tires of the vehicle 104 can include a unique identifier, such as an RFID, a QR cord, a barcode, or a serial number. When installing the tires to the vehicle 104, an operator can record the unique identifier of the tire and the location of the tire installed on the vehicle 104. The vehicle 104 can be equipped with sensors 108 mounted at any position within or on the vehicle 104. For example, the vehicle 104 can include sensors 108 mounted within the pressurized pocket between the wheel and the tire, on the wheel, on the tire, or embedded within different components of vehicle 104. The vehicle 104 can include hardware or software components to collect measured data from the sensors 108. The vehicle 104 can transmit the sensor data to the server 102 or the data processing system 110. For example, the vehicle 104 can transmit the sensor data to the data processing system 110 to store the sensor data in the data repository 124 and process the data via components of the data processing system 110. The vehicle 104 can receive notifications or commands from the data processing system 110, such as based on the processed sensor data, among other data used to reach a decision. In another example, the vehicle 104 can transmit at least a portion of the sensor data to the server 102 for storage on a remote data repository or for processing similar to the data processing system 110. The vehicle 104 can include an interface device to display notifications to the operator. The interface device can receive an indication of interaction from an operator, e.g., to provide feedback to the data processing system 110 subsequent to receiving notification.

The system 100 can include sensors 108 to record or measure components of the vehicle 104. The sensors 108 can be in electrical communication with the vehicle 104. For example, the sensors 108 can be mounted on the wheels or near the tires of the vehicle 104. The sensors 108 can include at least an accelerometer, a global positioning sensor ("GPS"), a pressure sensor (e.g., a tire sensor), a temperature sensor, a tachometer to measure the wheel speed (e.g., rotation per minute ("RPM")), a positioning sensor, or an image sensor for recording visual feedback. The accelerometer can record the acceleration of the vehicle 104 or the angular acceleration of the wheels. The GPS can record the location of the wheels of the vehicle 104. The temperature sensor can record the temperature of the tire (e.g., the treads, belts, or ply of the tire), the temperature of the rim, or the temperature of the pressurized pocket of the wheel. The positioning sensor can record the height of the wheel of the vehicle 104 with respect to the ground. In some cases, the sensors 108 or other sensors can be replaced or added to the vehicle 104.

The system 100 can include a server 102 or a remote computing device. In some cases, the server 102 can perform features and functionalities similar to the data processing system 110. In some other cases, the server 102 can be a second system for processing data. The server 102 can include hardware and software components. The server 102 can include a remote data repository to store, for example, sensor data from the vehicle 104 or inspection data of the tires. The server 102 can include one or more processors to clean, filter, or otherwise pre-process the data from the vehicle 104. In some cases, the server 102 can receive and process data delegated from the data processing system 110 via the network 101. In this case, once processed, the server 102 can transmit the processed data to the data processing system 110.

The system 100 can include at least one data processing system 110. The data processing system 110 can determine a type of maintenance to perform on a tire and predict when the tires should be serviced. The data processing system 110 can include hardware or a combination of hardware and software, such as communications buses, circuitry, processors, communications interfaces, among others. The data processing system 110 can reside on or within a computer or a cloud (e.g., remote device or system). For example, FIG. 1 shows a vehicle 104 in communication with the data processing system 110 via a network 101, such that the data processing system 110 can be remote to the vehicle 104. The data processing system 110 can connect to a different server 102 or remote computing device via the network 101. The data processing system 110 can delegate processing or storage tasks to the server 102. For example, the data processing system 110 can forward data package(s) received from the vehicle 104 to the server 102 for processing or storing the data in a remote data repository. The data processing system 110 can receive processed data from the server 102.

The data processing system 110 can include at least an interface 112, a matrix generator 114, a model manager 116, a notification manager 120, and a data repository 124. The data processing system 110 can utilize these components to detect early removal or maintenance of OTR tires. The components can be in electrical communication to transmit, receive, or retrieve information to or from other components within the data processing system 110. The OTR tires can be installed on the vehicle 104. The data processing system 110 can update or configure the data repository 124. The data repository 124 can include, store, or maintain sensor data 126, inspection data 128, identifier 130, model 132, maintenance 134 (e.g., maintenance 134 data structure), or notification 136 (e.g., notification 136 data structure). The data repository 124 can be accessed by other components of the data processing system 110, such as to store data to or retrieve data from the data repository 124. The data repository 124 can include other data structures to store any information generated by the components of the data processing system 110 or measured by the sensors 108, for example.

The sensor data 126 data structure can include, store, or maintain sensor data from the vehicle 104 equipped with the sensors 108. The sensor data 126 data structure can store other sensor data received via interface 112. The sensor data 126 data structure can store information related to one or more tires of the vehicle 104 recorded by the sensors 108. For example, the sensor data 126 data structure can include acceleration data, velocity data, positioning data, temperature data, pressure data, the load applied to the tires, height data, or other values from the vehicle 104. The sensor data can be used by the matrix generator 114 to generate a matrix for input into a machine learning model. The sensor data can include an identifier of each sensor 108 used for measuring or recording. The sensor data can be associated with a tire that the sensor 108 measured based on the location of the sensor 108 is used to obtain the sensor data (e.g., the sensor 108 location can correspond to the location of the tire with the unique identifier). In some cases, the sensor 108 can be fixedly coupled to the vehicle 104 such that they do not move with the tires as the tires are moved from one position to another on the vehicle 104 or one vehicle 104 to another. In some cases, the sensor 108 can be coupled to the tire or otherwise move with the tire as the tire position is changed or the tire is moved from one vehicle 104 to another. In some cases, the sensor 108 can include at least one sensor fixedly coupled to the vehicle 104 and at least one other sensor coupled to the tire. The sensor data can be linked to a unique identifier associated with the tire. For example, the data processing system 110 can receive and store the sensor data of a wheel on the vehicle 104. When storing the sensor data to the sensor data 126 data structure, the data processing system 110 can link the sensor data to the unique identifier of the tire installed on the vehicle 104.

The inspection data 128 data structure can include, store, or maintain inspection data of the vehicle 104. The inspection data can be recorded or measured using machines or electronic devices during inspection of the vehicle 104. In some cases, an inspector can perform manual inspection on the vehicle 104, record the measurements, and upload the measurements to the data processing system 110 for storage in the inspection data 128 data structure. The inspection data can include information related to the tires of the vehicle 104, such as the appearance or condition of the tire. The inspection data can include the position of the tire installed on the vehicle 104, such as the left/right/front/back position of the vehicle 104. For example, the inspection data can include any cuts visible on the tire, where the tire was installed on the vehicle 104, tire tread depth, tire pressure (e.g., checked manually), belt condition of the tire (e.g., signs of belt slip or a damaged belt), any puncture on the tire, the elasticity of the tire, or other conditions of the tire. The inspection data can be associated with a unique identifier of the inspected tire. For example, the inspector can retrieve or update profile information of the tire via the unique identifier associated with the tire. The inspection data 128 data structure can store other information from the inspector related to the tire with a unique identifier. The inspection data 128 data structure can include locations of the sensors 108 installed on the vehicle 104, where the inspector can associate the sensors 108 to their corresponding identifiers.

The identifier 130 data structure can include, store, or maintain unique identifiers associated with tires of one or more vehicles. The identifier 130 data structure can include identifiers of sensors 108 used to collect information of the vehicle 104 or the tires of the vehicle 104. The identifier 130 data structure can include an identifier of the vehicle 104 with the tires. The identifier 130 data structure can include a hash table, a linked list, a stack, among other data structures to group unique identifiers with their corresponding sensor data or inspection data. For example, the data processing system 110 can retrieve or store data of a respective tire by hashing the unique identifier. In another example, the data processing system 110 can map sensor data received from the vehicle 104 to a respective unique identifier associated with the tire. The mapping of the sensor data to the unique identifier can be based on the location of the sensors 108 used to measure information of the tire.

The model 132 data structure can include, maintain, or store one or more models from or for a machine learning engine managed by the model manager 116. The models can be referred to as machine learning models. The models can include at least, for example, Deep Boltzmann Machine model, Deep Belief Networks model, Convolutional Neural Network ("CNN") model, or Stacked Auto-Encoders model. The models can use decision tree data structure or Neural Networks data structure to detect or predict early OTR tire maintenance. The model 132 data structure can be updated or manipulated by the data processing system 110. The model 132 data structure can store newly generated models received from the model manager 116. The models can be retrieved from the model 132 data structure by the model manager 116. The models can be trained or updated by the model manager 116. The models can be trained using an input matrix from the matrix generator 114. The models can generate an output matrix or one or more output values based on the input matrix.

The maintenance 134 data structure can include, maintain, or store one or more tire maintenance categories, one or more types of maintenance for the tire, or one or more conditions (e.g., values) for tires to be serviced. The tire maintenance categories can include at least worn out, impact damage, or fatigue/durability. Tires within the worn-out category can include tires with a tread depth of less than a tread depth threshold, such as $4/32$ inches or $2/32$ inches. The impact damage category can include tires with one or more cuts or punctures. The fatigue category can include tires with treads leaving the casing, tread leaving the belt, separation of the inner lining and casing, among other structural defects of the tire. The types of tire maintenance can include at least removing materials damaging the tire, filling rubber into a void of the tire, sealing a portion of the tire (e.g., the inner liner of the tire), patching a portion of the tire, or in cases where repair are not an option, replacing the tire. The type of tire maintenance can be based on the tire maintenance category. For example, if the tire is punctured (e.g., impact damage), the type of tire maintenance can include removing the material that causes the puncture, filling the punctured hole of the tire with rubber, and sealing the inner liner of the tire. Other types of tire maintenance can be performed on the tire to increase longevity and prevent early fatigue of the tire. The maintenance 134 data structure can include severity levels of each maintenance category for the tire under inspection, indicating the severity of the respective maintenance category.

The notification 136 data structure can include text, user interface, images, or other groups of visual presentations for displaying a notification to an operator. The notification can be displayed on a display device of the vehicle 104. The notification can provide the operator with the condition of one or more tires, a prediction of a time interval to perform maintenance on the tires, or other messages related to the vehicle 104 or the tires. The notification 136 data structure can include indications of maintenance to be performed on one or more tires or other components of the vehicle 104. The notification 136 data structure can include one or more pre-build interfaces (e.g., warning or alert) to notify the operator of the maintenance. For example, the data processing system 110 can predict when the tire will be worn out (e.g., treads with a depth of fewer than $2/34$ inches) at a time interval (e.g., within a week or a month from the prediction date). The notification can include an indication to the operator to check the tread of the tire. This notification can appear prior to or during the predicted time interval. The notification can include interactive elements, such as a button or slider for the operator to provide feedback or confirmation. In this example, the operator can confirm that the tread depth is below the threshold or provide feedback that the tread depth is not below the threshold. In a further example, if the tire has not been serviced, the notification can include a second indication or a warning that the tire depth may be below a second threshold, which can diminish the performance of the tire or compromise the safety of operating the vehicle 104. Other examples can include multiple notifications on potential damage to the tire or fatigues of the tires.

The data processing system 110 can include an interface 112. The interface 112 can be designed, configured, constructed, or operational to receive and transmit information. The interface 112 can receive and transmit information using one or more protocols, such as a network protocol. The interface 112 can include a hardware interface, software interface, wired interface, or wireless interface. The interface 112 can facilitate translating or formatting data from one format to another format. For example, the interface 112 can include an application programming interface that includes definitions for communicating between various components, such as software components. The interface 112 can be designed, constructed, or operational to communicate with one or more sensors 108 to collect or receive information. The interface 112 can be designed, constructed, or operational to communicate with other components of the vehicle 104, such as to provide notifications to a display device of the vehicle 104. The interface 112 can facilitate communication with the server 102, such as to transmit or receive data packages to or from the server 102. The interface 112 can engage in communication with other components connected to the network 101. The interface 112 can interconnect components of the data processing system 110.

The interface 112 can receive sensor data from the sensors 108. The interface 112 can receive inspection data provided by an inspector. The interface 112 can retrieve the sensor data from the sensor data 126 data structure or the inspection data from the inspection data 128 data structure. The interface 112 can relay received or retrieved information to other components within the data processing system 110. For example, the interface 112 can provide sensor data and inspection data to the matrix generator 114. The interface 112 can provide the matrix from the matrix generator 114 to the model manager 116. The interface 112 can provide a type of maintenance or a maintenance category from the maintenance 134 data structure to the notification manager 120 and provide a notification to the vehicle 104.

The data processing system 110 can include a matrix generator 114 designed, constructed, or operational to generate at least one input or matrix for a machine learning model. The matrix can be referred to as an input matrix or one or more input variables used to train, generate, or update the machine learning model. The matrix generator 114 can be interconnected with other components of the data processing system 110. The matrix generator 114 can generate a matrix based on sensor data or inspection data. The matrix generator 114 can receive the sensor data or the inspection data in real-time (e.g., 1 second, 10 seconds, or 30 seconds from the measurements). The matrix generator 114 can retrieve sensor data or inspection data from the data repository 124. The matrix generator 114 can generate a matrix including a first dimension and a second dimension for input into a machine learning model. The matrix can be, for example, a two-dimensional ("2D") or a three-dimensional ("3D") array based on the sensor data or the inspection data. For example, the matrix generator 114 can generate a matrix with a time unit as the first dimension. The second dimension of the generated matrix can include one or more values of the sensor data or the inspection data. The matrix generator 114 can include a combination of the sensor data and the inspection data in the second dimension. The time unit can be referred to as a time interval for when the sensor data was captured or when the inspection data was measured. The time unit can be in minutes, hours, days, etc. The second dimension can include measurements of the tire, such as speed, height, visible damage, among others, and can include any unit corresponding to the type of measurement (e.g., inches, meters, or meters per second). The first dimension can be an x-axis and the second dimension can be a y-axis, and vice versa. For example, the first dimension can indicate the date and time the sensor data or the inspection data was measured or recorded.

The matrix generator 114 can generate multiple matrixes for one or more machine learning models. The matrix can group, categorize, label, or otherwise organize the data for the machine learning engine to process. The matrix can include computed data from the sensor data or the inspection data. The sensor data can include at least mechanical information (e.g., rotation data or acceleration data of the tire), load information (e.g., pressure data or compression data of the tire), position data indicating the height of the tire, or location data including a first coordinate and a second coordinate to track the location of the wheel. The height of the tire can be measured from the center of the wheel to the ground or based on the circumference of the tire. For example, the matrix generator 114 can generate a first matrix for training a machine learning model and a second matrix for predicting early OTR tire maintenance. The inspection data used to generate the matrix can include any history recorded for the tire identified by the unique identifier associated with the tire. The inspection data can include at least measurements of any damage on the tire (e.g., size and depth of a cut or a puncture), the depth of the tire treads, any indication of the tread leaving the casing, tread leaving belt, or separation of the inner liner and casing, any repairs or fixes performed on the tire, or other information a tire inspector provides. In some cases, the inspection data can include information on components related to the tire, such as the rim equipped with the tire, the vehicle using the tire, or the suspension assisting the wheel.

In another example, the matrix generator 114 can generate multiple matrixes for input into various machine learning models trained using different sets of training data samples. The sets of training data samples can be referred to as training input matrixes. The matrix generator 114 can store the matrix in the data repository 124. In some cases, the generated matrix can be a temporary data package for input into a machine learning model and discarded after training the model or predicting an output value or matrix. Similarly, the output value or matrix can be stored in the data repository 124.

The data processing system 110 can include a model manager 116 designed, constructed, or operational to manage, generate, remove, or update one or more machine learning models. The model manager 116 can include or manage a machine learning engine. The model manager 116 can uses the one or more machine learning models to predict at least one value for detecting early maintenance for tires. The prediction value can refer to a predicted condition of the tire after or during a time interval (e.g., a week, a month, or a year). The machine learning model can predict an output matrix with dimensions similar to the input matrix. For example, the machine learning model can output a matrix with a first dimension having a time interval not included in the input matrix (e.g., the upcoming day, week, or year) and a second dimension having at least a predicted tire pressure, predicted tire height, predicted appearance of the tire (e.g., additional cuts or puncture based on tire usage history), a maintenance category, or a type of maintenance at the time interval. The machine learning model can output other values or matrixes predicting the condition of the tire for early tire maintenance notification. These values or matrixes can include various severity of each tire maintenance category, e.g., a scale from 1 to 5, percentage of tire usability, or percentage of likelihood that the tire will remain usable throughout an operation.

The model manager 116 can train the machine learning models using one or more techniques (e.g., machine learning techniques, decision trees, or Neural Networks) to predict when and what type of maintenance to provide to one or more tires based on data from the input matrix. For example, the model manager 116 can use a decision tree to determine whether the tire is in one or more of the maintenance categories using the one or more input values. The model manager 116 can identify the operation type of the tire (e.g., what the tire is used for, such as off-road, mine site, highway, etc.). Using the machine learning model, the model manager 116 can determine if the operation type (encoded using a value) satisfies a threshold. In some aspects, one or more operations by the model manager 116 can be interchanged with one or more operations by the machine learning model, e.g., to predict the type of maintenance or determine the category of tire maintenance for a tire. If the operation type satisfies a threshold, the machine learning model can compare another status or condition of the tire, such as tire position, damage to the tire, or the type of vehicle using the tire, to a respective threshold. The machine learning model can iterate the process down the decision trees to determine the maintenance type of the tire, and when the tire should be serviced or repaired based on the input variables. In another example, the machine learning model can use Neural Networks to process the input data, such as to detect or distinguish patterns in high dimension data. Using the Neural Networks, the machine learning model can detect or determine characteristics or behaviors of the tire throughout daily operations. The machine learning model can predict a time interval for maintenance and a type of maintenance to perform on the tire based on these characteristics of the tire (e.g., operating temperature, roughness of the terrain, noise generated when in operation, among other indications of how the tire is used). The machine learning model can identify the historical usage of the tire. For example, the machine learning model can train or update the Neural Network by means of legacy data or using updated inspection history to predict when and why tires are removed or maintained. As an example, the tire can be removed due to minor or severe damage which require extensive maintenance time or the tire can be serviced for increasing pressure. The machine learning model can retrain the Neural Networks with updated sensor data and inspection data to increase the accuracy for detecting or predicting the type of maintenance for the tire, when to service the tire, or other histories of the tire.

The machine learning model can determine the likelihood that the output value (e.g., tire maintenance category or the time interval to service the tire) is accurately classified. In this case, the machine learning model can provide an output value with a likelihood greater than a threshold that the tire maintenance category is accurate. The threshold can be predetermined or set at, for example, 80%, 85%, 90%, or other percentages. For example, the machine learning model can predict or determine that a tire is 20% likely to be worn out, 10% likely to be fatigued, and 90% likely that the tire is damaged. The machine learning model can determine the severity of each maintenance category, such as a scale from 1 to 10 or a percentage of usability. For example, the machine learning model can predict, simultaneously, before, or after predicting the likelihood percentage, that the tire is 30% worn out, 5% fatigued, and 75% damaged. Accordingly, the machine learning model can provide an indication to the notification manager 120 to notify an operator of the detected early maintenance for the tire. In another example, the likelihood of the tire falling under a maintenance category can correspond to the severity of each maintenance category. For example, if the tire is 30% likely to be worn out, this can indicate that the tire is 30% worn out. In cases where the machine learning model provides a 50% or greater likelihood that the tire should be in a certain maintenance category (e.g., middle-ground cases), the machine learning model can still indicate the maintenance category or the type of maintenance that can be performed on the tire to the operator.

The model manager 116 can retrieve information associated with the tire for training or facilitating the prediction based on a unique identifier of the tire. For example, the model manager 116 can retrieve historical inspection data of the tire via a look-up of the unique identifier of the tire. The model manager 116 can retrieve the inspection data from the inspection data 128 data structure or a remote data repository on the server 102, if additional data are stored on the server 102. Other than inspection data, the model manager 116 can retrieve historical sensor data from the data repository 124 or a remote data repository to update the machine learning model. In some cases, the model manager 116 can link or group the sensor data and historical data associated with the unique identifier together for updating/training the machine learning model. The model manager 116 can store, update, or otherwise manage models stored in the model 132 data structure. In some cases, the model manager 116 can train the machine learning model using data from other tires similar to the tire of the input variables, such as similar size, model, or condition as the tire. By training the model with data from similar tires, the model can better comprehend the characteristics, durability, structure, or quality of the tire.

The data processing system 110 can include a notification manager 120 to manage commands or notifications to one or more devices, such as a display device within the vehicle 104. The notification manager 120 can receive a prediction or an output from the model manager 116. For example, the notification manager 120 can receive one or more predictions including whether a tire of a vehicle 104 should be serviced (e.g., condition of the tire), which tire of the vehicle 104, when to perform maintenance on the tire, the type of maintenance for the tire based on the condition of the tire, or other information related to the tire. The notification manager 120 can retrieve one or more notifications from the notification 136 data structure based on the output of the machine learning model.

The notification manager 120 can provide the one or more notifications to the vehicle 104, for example, to inform, recommend, or advise an operator or driver to perform maintenance on the tire. The notification manager 120 can provide a schedule or a time interval for servicing the tire. For example, the notification manager 120 can receive an indication of a tire maintenance type for damaged tires and a time interval to perform maintenance. In this example, the notification manager 120 can retrieve a notification corresponding to the tire maintenance type "damage" and provide the notification indicating the damage to the tire and the time interval for resolving the issues. The time interval can include a timeframe when the tire may be inoperable or when the tire is introducing hazardous driving conditions. In some cases, the notification manager 120 can provide one or more notifications to a device associated with the vehicle 104 equipped with the tire, such as a mobile device of the operator. Accordingly, the data processing system 110 can use the aforementioned components to provide early detection for tire maintenance to improve inventory management, vehicle operations, budgetary decisions, and mitigate potential impacts of damaged, worn out, or fatigued tires.

Figure 2:
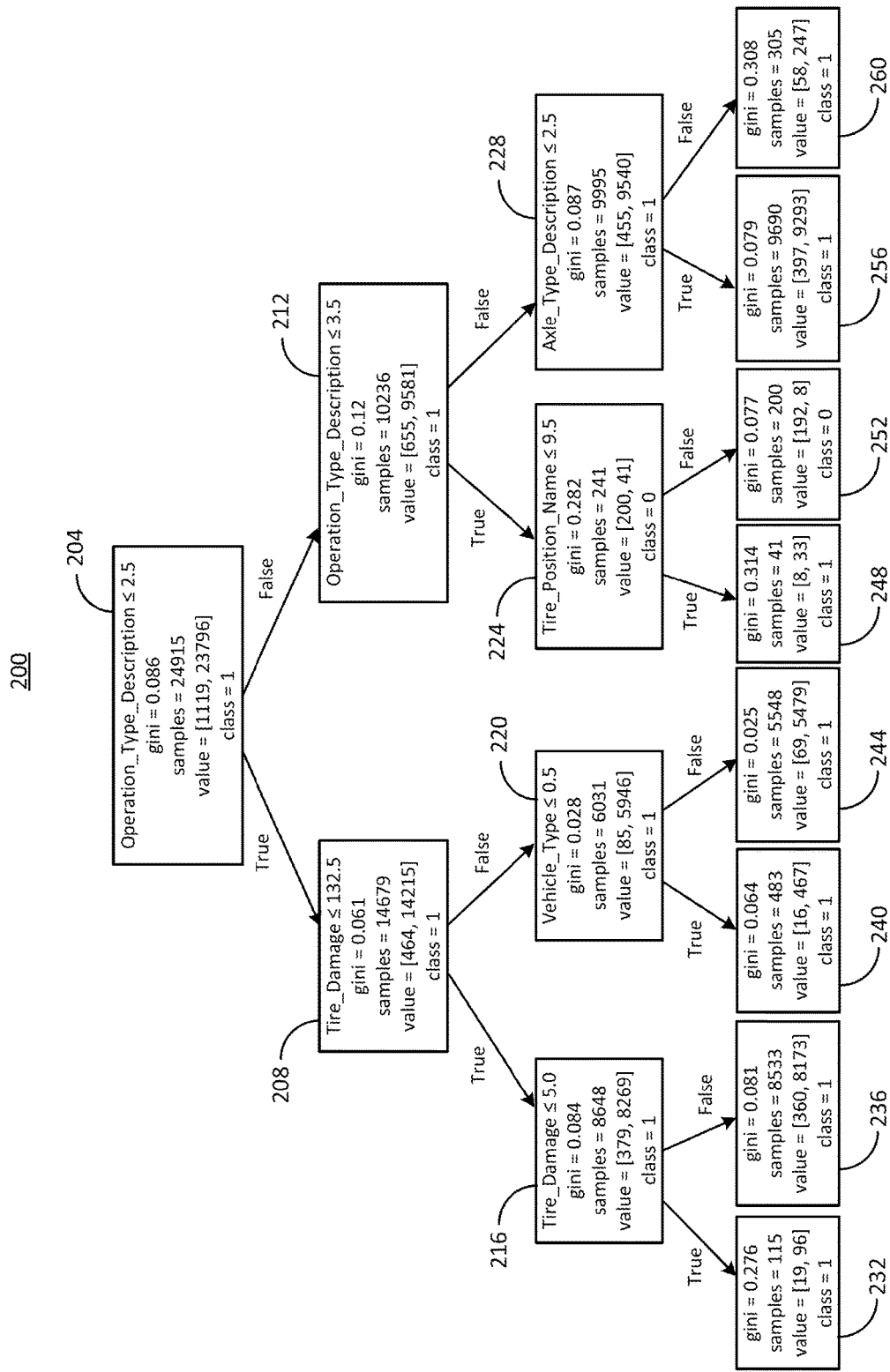
FIG. 2 depicts an example operational diagram for classifying conditions to perform maintenance on the tire, in accordance with an embodiment.

FIG. 2 depicts an example operational diagram for classifying conditions to perform maintenance on the tire, in accordance with an embodiment. The operation 200 can be performed by one or more systems, components, or functions depicted in FIG. 1 and FIG. 5. The operation 200 can assist with classifying the conditions leading to the type of removals or maintenances of tires. With simple yes-no type questions, the data can be classified to detect removals. For example, the operation 200 can be performed by a data processing system, a server, a vehicle, sensors, an interface, a matrix generator, a model manager, a notification manager, or a data repository. The operation 200 can be performed by the data processing system using the machine learning model based on one or more input values or an input matrix. The operation 200 can include blocks 204 to 260 to determine a tire maintenance category or a likelihood that the tire is in the tire maintenance category for early detection of tire maintenance. Each block can include one or more thresholds for comparison with the input values. After comparing the input values to the thresholds, the data processing system can determine a subsequent block either for comparison with additional thresholds or determining the likelihood of the maintenance category. Each block can include example thresholds or values that can be configured based on real-world conditions for maintaining or removing tires (e.g., historical inspection data of various tires). The order of the operational diagram (e.g., decision trees) can be configured to optimize accuracy for predicting a maintenance category of the tire or the likelihood of the maintenance category.

At block 204, the data processing system can determine whether an operation type of the tire is less than or equal to 2.5. The operation type can represent a threshold in this block. The value representing the operation type, as well as other descriptions including tire damage or vehicle type, can be an encoded value for their corresponding description. For example, an operation type of 2.5 or less can refer to OTR tires used for mine or construction sites, an operation type of 3.5 or less can refer to tires for winter or rough road condition, such as dirt or gravel roads, and an operation type of greater than 3.5 can refer to regular street tires, including all-weather tires or highway tires.

With each block, the data processing system can determine Gini (i.e., Gini index, Gini impurity, or Gini coefficient) and a sample value based on the comparison with the threshold. The Gini can include values between 0 and 1, with the lower value indicating that the samples belong to a certain category and the higher value indicating that the samples are randomly distributed across various categories. The Gini value of approximately 0.5 can indicate that the data samples are equally distributed across pre-defined categories, such as two or three categories. In other words, the Gini value can indicate a certainty of the samples belonging to one or more categories or whether the comparison between samples and the one or more thresholds are accurate. By comparing each data sample, the data processing system can determine one or more true or false values. In this example, the data processing system can input a sample size (e.g., input values) of 24,915 to the machine learning model and determine that 1,119 samples are true and 23,796 samples are false. Based on the true and false, the data processing system can determine a value to determine which block to proceed to (e.g., via division or subtraction of the true/false samples). For example, if the true samples are greater than the false samples, the data processing system can proceed to block 208 and if the true samples are less than the false samples, the data processing system can determine to proceed to block 212.

The data processing system can proceed to one of the next blocks to further evaluate the data samples satisfying or not satisfying the threshold. For example, the data processing system can determine that 40% of the samples satisfy the threshold while 60% of the samples do not. In this case, the data processing system can proceed to a second block with 40% of the samples and to a third block with 60% of the samples. Hence, the data processing system can compare the samples to different thresholds simultaneously or within a single processing task.

At block 208, the data processing system can determine if the samples include tire damage of less than or equal to 132.5 (e.g., comparison with a first tire damage threshold). The tire damage value can be an encoded value indicating the level of damage previously or currently presented on the tire. For example, tire damage of 132.5 can indicate that the tire includes one or more cuts or punctures potentially leaking air to cause a flat tire. In this example, having less tire damage value can indicate a healthy tire, while tires with above 132.5 damage value can be leaking air under normal tire operation or while the vehicle is stationary. In some cases, the damage value can indicate the depth or size of a cut or a puncture. If the tire damage is less than or equal to 132.5, the data processing system can proceed to block 216. Otherwise, the data processing system can proceed to block 220.

At block 216, the data processing system can compare the input samples to a second tire damage threshold. For example, the data processing system can compare the input samples to a tire damage value of 5. The data processing system can proceed to block 232 if a larger proportion of samples indicates tire damage of less than or equal to the threshold or proceed to block 236 if otherwise. At block 220, the data processing system can compare the input samples to a vehicle type threshold. For example, the vehicle type threshold can include an encoded value of 0.5. The encoded vehicle type value can refer to the type of vehicle using the tire, such as a value of 0 for a sedan, a value of 0.5 for a truck, or a value of 1 for a loader. The encoded values can be adjusted by an operator of the system administrator. In this example, the data processing system can determine, based on the samples, to proceed to block 240 if the vehicle type is less than or equal to 0.5 or proceed to block 244 if the vehicle type is greater than 0.5.

At blocks 232 to 260, the data processing system can determine whether maintenance should be performed on the tire or what type of maintenance should be performed on the tire (e.g., the tire maintenance category to which the tire belongs). For example, after comparing the input values to the thresholds in the respective previous blocks, the data processing system can arrive at a final block (e.g., at least one of clocks 232 to 260) indicating whether to perform maintenance on the tire and what type of maintenance to perform on the tire. In a further example, each of blocks 232 to 260 can correspond to at least one of a maintenance category or a decision of whether to perform maintenance on the tire. The data processing system can determine a likelihood that the samples meet the criteria for the maintenance category. For example, block 232 can indicate that no maintenance is necessary, and block 236 can indicate that the tire should be inspected for minor damage. At block 232, the data processing system can determine that there is a 19/115=16.5% likelihood that the data samples indicate the maintenance category of block 232. Each block can include a likelihood threshold, such as 40%, indicating that the data samples belong in the category or block. The data processing system can determine the likelihood for blocks 236 to 260 similar to block 232. Accordingly, at block 236, the data processing system can determine a likelihood of 360/8533=4.22%. In some cases, the data processing system can determine the likelihood for other blocks, such as blocks 204 to 228.

After determining the type of vehicle using the tire, the data processing system can determine, at block 240, that the damage is severe (e.g., the tire should be in service as soon as possible) or, at block 244, that the damage is not as severe, but the tire should be still be inspected, for example. The data processing system can determine the likelihood of the input values being in each of the blocks or type of maintenance. Referring back to block 204, if the operation type is greater than 2.5, the data processing system can proceed to block 212.

At block 212, the data processing system can compare the input values to a second operation type threshold different from the first operation type threshold at block 204. In this example, the data processing system can proceed to block 224 if the operation type is less than or equal to 3.5 or proceed to block 228 if the operation type is greater than 3.5. At block 224, the data processing system can compare input values to a tire position name threshold. The tire position name threshold can include an encoded value, which can indicate the wheel base position (e.g., height of wheel measured from the center of the wheel to the ground). For example, the data processing system can proceed to block 248 if the tire position is less than or equal to 9.5 or proceed to block 252 if the tire position is greater than 9.5. At block 228, the data processing system can compare input values to an axle type threshold. The axle type threshold can include an encoded value for an axle type of the vehicle, such as front, rear, or stub type. For example, a 2.5 axle type can indicate a rear axle type, a 0 axle type can indicate a front axle type, and a 5 axle type can indicate a stub axle type. If the axle type is less than or equal to 2.5, the data processing system can proceed to block 256 or if the axle type is greater than 2.5, the data processing system can proceed to block 260.

Each of blocks 248, 252, 256, or 256, similar to blocks 232 to 244, can indicate a maintenance type or whether the tire should be serviced. For example, block 248 can indicate that the tire is damaged (e.g., under damage maintenance category), block 252 can indicate that the tire is worn out, block 256 can indicate that the tire is fatigued, and block 260 can indicate that the tire should be replaced. The data processing system can determine that, at block 252, the likelihood of the input values belonging to the maintenance category is higher than other blocks. In this example, the likelihood at block 252 can be 192/200=96% likely that the tire is worn out. Hence, the data processing system can notify the operator of the tire maintenance category based on the likelihood determined using the operation 200.

Figure 3:
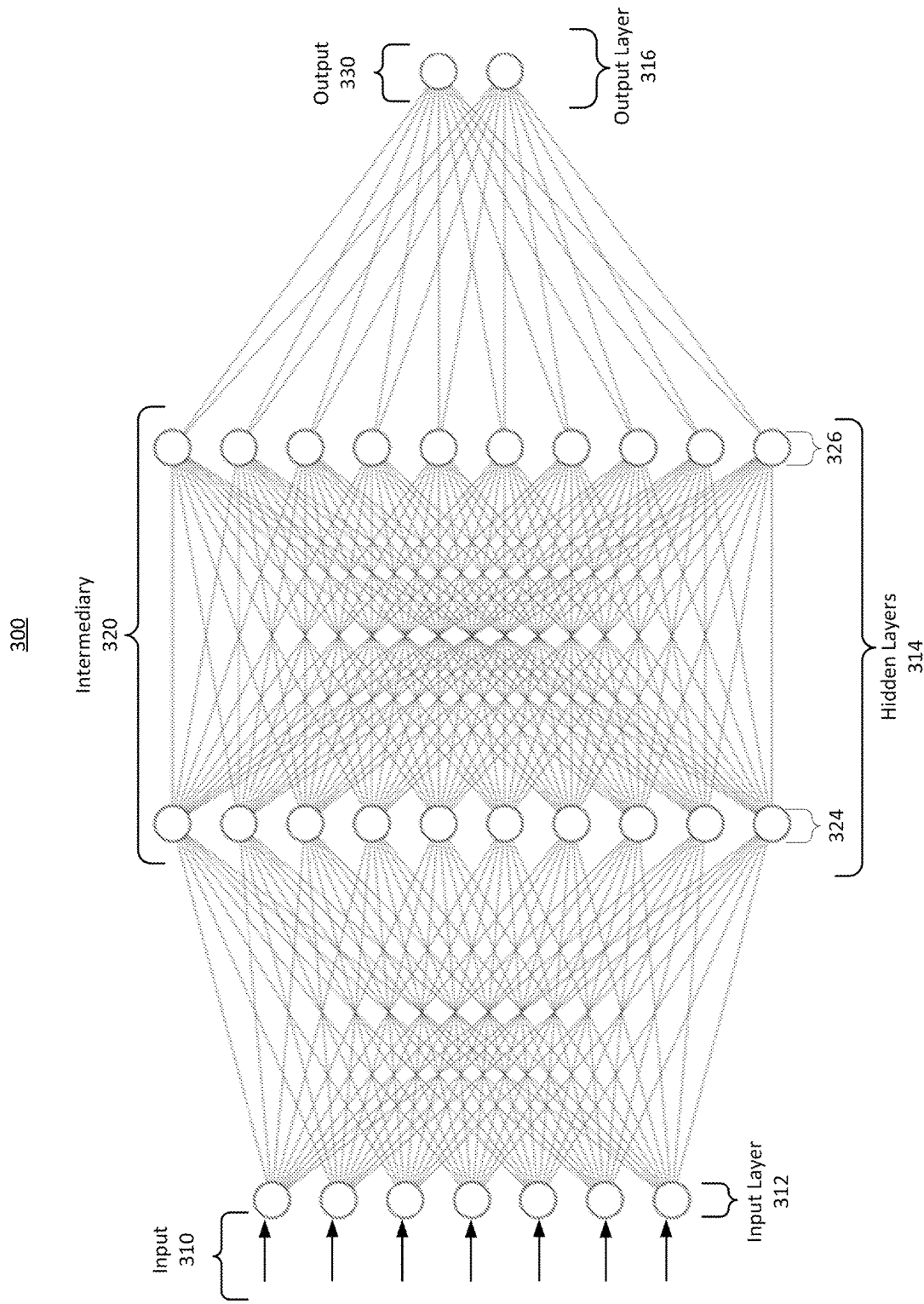
FIG. 3 depicts an example of a neural network used by a machine learning engine to predict a time interval to perform maintenance and a tire maintenance category, in accordance with an implementation.

FIG. 3 depicts an example of neural network 300 used by a machine learning engine to predict a time interval to perform maintenance and a tire maintenance category, in accordance with an implementation. FIG. 3 depicts an example operation of a neural network used by a machine learning engine to detect early tire maintenance, such as for OTR tires. The operation can be performed by one or more systems, components, or functions depicted in FIG. 1, FIG. 2, or FIG. 5. For example, the operation can be performed by or via a data processing system, a server, a vehicle, sensors, interface, matrix generator, model manager, notification manager, or data repository.

At ACT 310, the data processing system can input various information from sensors or from a database storing inspection data related to a tire at the input layer 312 of the neural network 300. The various information from the sensors can be described in further detail in FIG. 1. The data processing system can further input a matrix corresponding to the information sensed by the sensors or information from historical inspection of the tire. For example, the generated matrix can clean or filter sensor data or inspection data retrieve from a database to provide the machine learning model. The data processing system can input the matrix at the input layer 312.

Subsequent to the input at ACTS 310, the data processing system can pass the input information to shared convolution layers of the neural network 300. The input layer 312 can be trained, configured or operational to receive, as input, at least the sensor data, inspection data, or input matrix, and output data to the hidden layers 314. The neural network can include multiple hidden layers, such as a first hidden layer 324 and a second hidden layer 326. The neural network can further include a third hidden intermediary layer (not shown) and a fourth hidden intermediary layer (not shown). The neural network can include an output layer 316. Each of the layers can represent a step or a task the neural network propagate to process the input values into generating one or more output values.

The hidden layers 314 can be convolution layers, pooling layers, fully connected layers, or weighted layers. Each node in the layer can perform a process or operation on the data. Each node or layer can transform an input data to generate an output data (e.g., an intermediate output that can be passed to a subsequent layer, or a final output passed to another component in the system). The hidden layers 314 can be an intermediary 320 between the input 310 and the output 330.

For example, the first input layer 312 can receive the sensor data or retrieve the inspection data, process the data to transform the data to a first intermediate output, and forward the first intermediate output to a first hidden layer 324. The first hidden layer 324 can receive the first intermediate output, process the first intermediate output to transform the first intermediate output to a second intermediate output, and forward the second intermediate output to a second hidden layer 326. The second hidden layer 326 can receive the second intermediate output, process the second intermediate output to transform the second intermediate output to a third intermediate output, and forward the third intermediate output to a third hidden intermediary layer (not shown). The third hidden intermediary layer can receive the third intermediate output, process the third intermediate output to transform the third intermediate output to a fourth intermediate output, and forward the fourth intermediate output to a fourth hidden intermediary layer (not shown). The fourth hidden intermediary layer can receive the fourth intermediate output, process the fourth intermediate output to transform the fourth intermediate output to a fifth intermediate output, and forward the fifth intermediate output to an output layer 316. The output layer 316 can receive the fifth intermediate output, process the fifth intermediate output to transform the fifth intermediate output to a final output, and forward the final output. The final output can include early tire removal or maintenance prediction 330. The output prediction 330 can correspond to, for example, a maintenance category or a determination of whether the tire should be serviced. The output prediction 330 can be used for generating or updating a tire maintenance schedule. Thus, the neural network 300 can be configured, trained, tuned or operational to receive sensor data or retrieve inspection data, and output predictions using a convolution neural network having one or more hidden layers.

Figure 4:
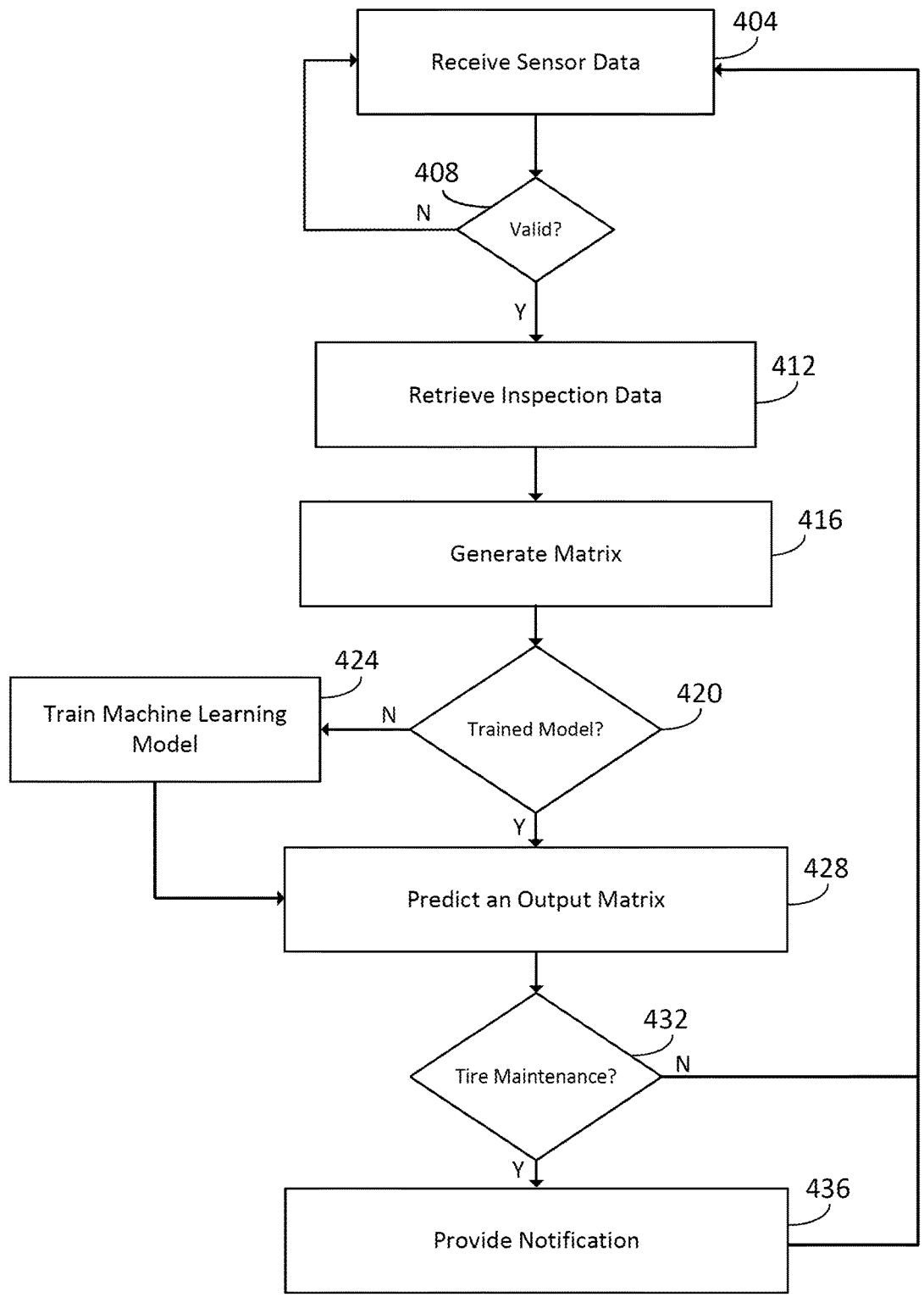
FIG. 4 is a flow diagram depicting an example method for tire maintenance, in accordance with an implementation.

FIG. 4 depicts a flow diagram depicting an example method for tire maintenance, in accordance with an implementation. The method 400 can be performed by one or more systems, components, or functions depicted in FIG. 1-3, or 5, including, for example, by a data processing system, a server, a vehicle, sensors, interface, matrix generator, model manager, notification manager, or data repository. In brief overview, the data processing system can receive sensor data at ACT 404. At ACT 408, the data processing system can determine whether the sensor data were valid. At ACT 412, the data processing system can retrieve inspection data. At ACT 416, the data processing system can generate a matrix. At ACT 420, the data processing system can determine whether a machine learning model was trained. At ACT 424, the data processing system can train a machine learning model. At ACT 428, the data processing system can predict an output matrix. At ACT 432, the data processing system can determine whether to perform maintenance on the tire. At ACT 436, the data processing system can provide a notification.

Still referring to FIG. 4 in further detail, at ACT 404, the data processing system can receive one or more values including sensor data via one or more sensors of a tire. The one or more sensors can be mounted inside the tire, near the wheel, on the rim, or any locations to measure data of the vehicle and the tire. The data processing system can receive a unique identifier associated with the tire equipped on a vehicle. The sensor data can include at least one of the pressure data, temperature data, mechanical data (e.g., rotation data), load data (e.g., pressure data and compression data) of the tire, among other data related to the vehicle tire. In some cases, the data processing system can receive location data via at least one of the sensors, indicating the location (e.g., a first coordinate and a second coordinate) of the wheel on a map. The data processing system can receive sensor data periodically, continuously, responsive to a request, or responsive to an event or trigger.

The data processing system can link the received sensor data (e.g., one or more values from the one or more sensors) to a unique identifier associated with the tire the information was sensed from. For example, the data processing system can determine a unique identifier based on the position of the one or more sensors used to collect the sensor data. Based on the position, the data processing system can determine a corresponding wheel/tire at the position of the vehicle. The unique identifier of the wheel can be pre-recoded in the data repository, such that the unique identifier can be identified based on the position of the sensor. In some cases, the one or more sensors can include the unique identifier of the tire when transmitting the data to the data processing system. By linking the sensor data and the unique identifier, the data processing system can store the sensor data with inspection data associated with the tire.

At ACT 408, the data processing system can determine whether the data from the one or more sensors of the vehicle is insufficient for input into the machine learning engine for generating a model or prediction. For example, the sensor data can include noise or drift in the measurements or may not have sufficient resolution, granularity, or sampling rate. In some cases, the sensor data can have a low signal-to-noise ratio or have high amounts of artifacts or noise. The data processing system can determine to remove or filter any unwanted data, such as sensor data with high amounts of artifacts or low-resolution data that may affect the accuracy of the machine learning model prediction. In some cases, the data processing system can adjust or correct the sensor data. For example, the data processing system can adjust the sensor data with drift (e.g., changing the data collection time) to reduce or fix the drift in the sensor data. By validating the sensor data, the data processing system can provide accurate data samples for generating a matrix or for inputting into the machine learning model. After the sensor data are valid, the data processing system can proceed to ACT 412. In some cases, if the sensor data are not valid, the data processing system can go back to ACT 404. For example, the data processing system can determine a lack of sufficient quantity of sensor data after filtering a subset of sensor data.

At ACT 412, the data processing system can retrieve historical inspection data associated with the unique identifier of the tire from a tire data structure. The tire data structure can refer to the data repository. For example, the data processing system can perform a look-up for any inspection data associated with the tire. The association between the tire and the inspection data can be linked via the unique identifier of the tire. The data processing system can hash the unique identifier value in an inspection data storage (e.g., inspection data structure within the data repository) to determine any inspection history of the tire. The data processing system can link the inspection data with the sensor data under the same unique identifier, as both data correspond to the same tire. The inspection data can be referred to as or used interchangeably with other descriptive terms, such as historical inspection data, check-up history, repair history, or manufacturing history. In some cases, the data processing system can retrieve the inspection data from a remote device or a server. Similarly, the data processing system can transmit information for storage on the remote device.

The inspection data can include at least location data, tire position data, tire structure data, or appearance data. In this case, the location data can indicate which wheel of the vehicle the tire was installed on (e.g., front, left, right, back of the vehicle). The tire position data can indicate the circumference, the height of the tire, or when equipped to a rim, the distance of the middle of the rim to the ground. The tire structure data can include information regarding the belt, tread, sidewall, casing, beads of the tire, or other composition data regarding how the tire was manufactured. The tire structure data can include data related to alteration or modification of the tire structure. The appearance data can include any visible marking or pattern of the tire, such as a cut, diminishing treads (e.g., tread depth), an indication of fatigues (e.g., tread leaving casing, tread leaving belt, separation of inner liner and casing, etc.), a puncture, prior patching (e.g., indicating that the tire was previously fixed), or a burn mark. The inspection data can be stored in the data repository before receiving the sensor data. The data processing system using the machine learning model can process the inspection data as a baseline condition of the tire, use the sensor data to learn the behaviors or events the tire went through, and predict the current and future condition of the tire within a time interval, such as a week, a month, or a year.

The data processing system can retrieve other historical inspection data associated with other tires. For example, the data processing system can retrieve a second historical inspection data including at least condition data, tire maintenance categories, or types of maintenance performed on the tires. The data processing system can use these historical inspection data to train or update the machine learning model. The data processing system can compare the received sensor data and the inspection data (e.g., first historical inspection data) to the second historical inspection data having conditions for when the tires should be serviced. Based on the comparison, the data processing system can determine a subset of the second historical inspection data to input into the machine learning model for detecting early maintenance of the tire. The data processing system can determine the subset based on similar traits or conditions of other tires.

At ACT 416, the data processing system can generate a matrix (e.g., an input matrix) for input into a machine learning model. The data processing system can utilize the matrix generator to generate the matrix based on sensor data, inspection data, or the combination of sensor data and the inspection data. The matrix can be a confusion matrix, accuracy matrix, precision matrix, sensitivity matrix, specificity matrix, or other related matrices for input to the machine learning engine. The data processing system can store the matrix in the data repository. The data processing system can use the matrix to train or update the machine learning model or to output the prediction of early tire maintenance detection. For example, the data processing system can generate a matrix with a first dimension having a time interval associated with when the sensor data was collected or when the inspection data was measured. The matrix can include a second dimension associated with the sensor data and/or the inspection data, where the data are placed in the matrix corresponding to the collected or measured time interval. The matrix can include timestamps that correspond with each of the sensor data or the inspection data. Using the matrix, the data processing system can determine the history, life cycle, usage characteristics, or other conditions or effects the tire is exposed to. Once generated, the data processing system can proceed to ACT 420.

At ACT 420, the data processing system can determine whether the machine learning model was trained or if there is any model within the model data structure that is trained. For example, the data processing system can retrieve a model from the data repository. The data processing system can determine at least the last updated time, a quantity of training data input into the model, or one or more tire maintenance categories the model can predict. If the model is trained, the data processing system can proceed to ACT 428. In the case of no trained model, the data processing system can proceed to ACT 424. At ACT 424, the data processing system can provide one or more historical input matrixes or values for training the machine learning model. The historical input matrixes can include historical inspection data or historical sensor data associated with other tires. The historical inspection data and the historical sensor data for each tire can be grouped based on the unique identifier of the tire. The data processing system can proceed to ACT 428 after training the machine learning model.

At ACT 428, the data processing system can predict an output matrix by inputting the matrix into a machine learning model constructed to output condition data of the tire. The output matrix can indicate at least one tire maintenance category, a type of maintenance to perform on the tire, and whether maintenance should be performed on the tire. If the output indicates that maintenance should be performed on the tire, the output matrix can indicate a time interval and at least one tire maintenance category for performing the maintenance. The tire maintenance category can include at least a worn-out category, damage category, fatigue category, or durability category. The output matrix can include the level of severity for each tire maintenance category, such as the current level of damage or worn-out of the tire or the predicted level at the time interval. After determining the output matrix, the data processing system can proceed to ACT 432.

In some cases, the data processing system can use the machine learning model to output a prediction based on decision tree operations. For example, the data processing system can compare the inspection data and sensor data (e.g., input values) of the tire with the historical inspection data (e.g., second historical inspection data) of other tires, where the historical inspection data can include conditions for removing or fixing the tires. The data processing system can compare the input values to one or more thresholds (e.g., criteria for removal or maintenance of the tires) from the historical inspection data. Based on the comparison, the data processing system can determine whether the sensor data and/or the inspection data are comparable to any criteria for performing maintenance on the tire including a similar tire maintenance category.

At ACT 432, the data processing system can determine whether to perform maintenance or service the tire. For example, the data processing system can determine or predict that the depth of the cut or puncture in the tire is not severe, or does not exceed 40% of the total tire depth (e.g., materials of the tire up to the body ply of the tire). Hence, the data processing system can determine that the level damage does not demand maintenance on the tire within the time interval. The time interval can be pre-determined by the operator (e.g., pre-set to predict a week or a month from the current time) or dynamically adjusted based on new behavior/usage of the tire or if the tire is used in rough terrain. Accordingly, if no maintenance is needed within the time interval, the data processing system can revert to ACT 404 to collect additional sensor data, update the machine learning model, among other prior actions. If the data processing system determines that maintenance should be performed on the tire within the time interval, the data processing system can proceed to ACT 436.

At ACT 436, the data processing system can provide an indication to perform one or more types of maintenance for the tire during the time interval and at least one tire maintenance category. The indication can refer to a notification provided to a display device of the vehicle to notify the operator of the prediction. The data processing system can retrieve different types of notifications or user interfaces from the data repository. The notification types are based on at least one of the maintenance categories, the type of maintenance to perform on the tire, or the time interval (e.g., recommended time interval) to perform the maintenance or have the tire be inspected. The data processing system can provide the severity or condition information of the tire to the operator. Accordingly, once the notification is provided, the data processing system can revert to ACT 404 to collect additional information on the tire.

The data processing system can provide the notification with one or more interactive elements for interaction by the operator for feedback. For example, the notification can notify the operator to check the tire for potential leakage. In determining whether there is an air leak, the data processing system can receive feedback from the operator accordingly. In some cases, due to false positive or false negative in the prediction (e.g., a first prediction), the data processing system can revert to ACT 424 or ACT 428 to retrain or update the machine learning model or output a second prediction using the machine learning model.

Figure 5:
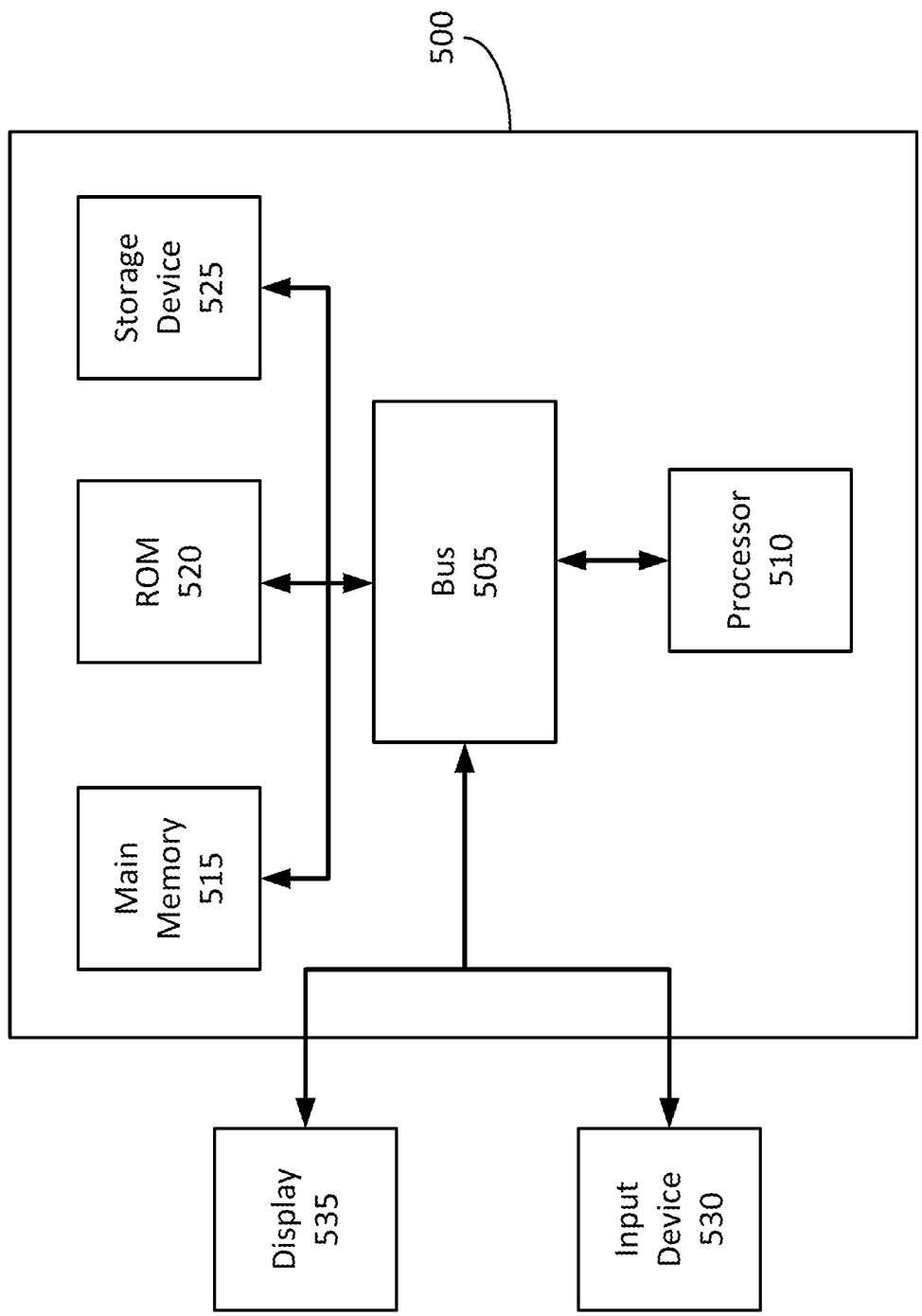
FIG. 5 is a block diagram illustrating an architecture for a computer system that can be employed to implement elements of the systems and methods described and illustrated herein, including, for example, the systems depicted in FIG. 1, operations or examples depicted in FIGS. 2-3, and the method depicted in FIG. 4.

FIG. 5 is a block diagram of an example computer system 500. The computer system or computing device 500 can include or be used to implement the data processing system 110, or its components such as the data processing system 110. The computing system 500 includes at least one bus 505 or other communication components for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory ("RAM") or other dynamic storage devices, coupled to the bus 505 for storing information, and instructions to be executed by the processor 510. The main memory 515 can be or include the memory or storage device. The main memory 515 can also be used for storing various parameters information related to the manufacturing equipment, or other information during execution of instructions by the processor 510. The computing system 500 may further include at least one read only memory ("ROM") 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as an operator of the manufacturing equipment. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 110, the sensors 108, or other components of FIG. 1.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the vehicle 104 and sensors 108 illustrates one grouping of operations and responsibilities of these system components. Other groupings that execute similar overall operations are understood to be within the scope of this application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (e.g. springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit this disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, or orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of this disclosure.

The systems and methods described herein may be embodied in other specific forms without departing from the characteristics thereof. The scope of the systems and methods described herein is thus indicated by the appended claims, rather than the foregoing description, and changes that come within the meaning and range of equivalency of the claims are embraced therein.

The invention claimed is:

1. A system for off road tire maintenance, comprising:
a data processing system comprising one or more processors and memory configured to:
receive, via one or more sensors of a tire, one or more values comprising sensor data and a unique identifier associated with the tire equipped on a vehicle, the sensor data comprising pressure data and temperature data;
retrieve, from a tire data structure comprising at least the unique identifier of the tire and a plurality of timestamps associated with the unique identifier, historical inspection data associated with the unique identifier, wherein each of the plurality of timestamps corresponds to the sensor data and the historical inspection data;
generate a matrix comprising a first dimension based on timestamps and a second dimension based on the one or more values and the historical inspection data;
predict, via input of the matrix into a machine learning model constructed to output condition data of the tire, an output matrix comprising an indication to perform a type of maintenance selected from a plurality of types of maintenance for the tire during a time interval and at least one tire maintenance category; and
provide, responsive to the prediction, the indication to perform the type of maintenance for the tire during the time interval and the at least one tire maintenance category.

2. The system of claim 1, wherein the data processing system is configured to train, via a machine learning engine, the machine learning model using historical sensor data and other historical inspection data of a plurality of tires to predict the output matrix.

3. The system of claim 1, wherein the historical inspection data is first historical inspection data, and wherein the data processing system is configured to:
retrieve, from the tire data structure, second historical inspection data of a plurality of tires comprising condition data of the plurality of tires, a plurality of tire maintenance categories, and the plurality of types of maintenance performed for the plurality of tires;
compare the first historical inspection data of the tire to the second historical inspection data of the plurality of tires; and
input, based on the comparison, a subset of the second historical inspection data corresponding to the historical inspection data into the machine learning model to output the condition data of the tire.

4. The system of claim 3, wherein the second historical inspection data comprise one or more thresholds associated with the plurality of tire maintenance categories, and wherein the data processing system is configured to:
compare the one or more values of the tire to the one or more thresholds; and
determine, based on the comparison between the one or more values and the one or more thresholds and the comparison between the first historical inspection data and the second historical inspection data, the condition data of the tire and the at least one tire maintenance category.

5. The system of claim 1, wherein the data processing system is configured to:
link the one or more values comprising the sensor data to the unique identifier associated with the tire; and
store, to the tire data structure responsive to linking the sensor data to the unique identifier, an association between the one or more values and the unique identifier.

6. The system of claim 1, wherein the data processing system is configured to:
receive, from a remote computing device, the historical inspection data via an inspection on the tire; and
store, in the tire data structure, an association between the historical inspection data and the unique identifier associated with the tire.

7. The system of claim 1, wherein the at least one tire maintenance category comprises at least one of worn out category, impact damage category, or durability category for performing the type of maintenance for the tire.

8. The system of claim 1, wherein the historical inspection data comprises location data, tire position data, tire structure data, and appearance data, and wherein the sensor data further comprises mechanical data and load data of the tire.

9. The system of claim 8, wherein the mechanical data comprises rotation data of the tire, wherein the load data comprises the pressure data and compression data of the tire, wherein the location data comprises a first coordinate and a second coordinate of the tire on a map, and wherein the tire position data comprises a distance from a center of a wheel to ground and a position equipped on the vehicle.

10. A method for off road tire maintenance, comprising:
receiving, by a data processing system comprising one or more processors and memory, via one or more sensors of a tire, one or more values comprising sensor data and a unique identifier associated with the tire equipped on a vehicle, the sensor data comprising pressure data and temperature data;
retrieving, by the one or more processors, from a tire data structure comprising at least the unique identifier of the tire and a plurality of timestamps associated with the unique identifier, historical inspection data associated with the unique identifier, wherein each of the plurality of timestamps corresponds to the sensor data and the historical inspection data;
generating, by the one or more processors, a matrix comprising a first dimension based on timestamps and a second dimension based on the one or more values and the historical inspection data;
predicting, by the one or more processors, via input of the matrix into a machine learning model constructed to output condition data of the tire, an output matrix comprising an indication to perform a type of maintenance selected from a plurality of types of maintenance for the tire during a time interval and at least one tire maintenance category; and
providing, by the one or more processors, responsive to the prediction, the indication to perform the type of maintenance for the tire during the time interval and the at least one tire maintenance category.

11. The method of claim 10, further comprising:
training, by the one or more processors, via a machine learning engine, the machine learning model using historical sensor data and other historical inspection data of a plurality of tires to predict the output matrix.

12. The method of claim 10, wherein the historical inspection data is first historical inspection data, and wherein the method further comprises:
retrieving, by the one or more processors, from the tire data structure, second historical inspection data of a plurality of tires comprising condition data of the plurality of tires, a plurality of tire maintenance categories, and the plurality of types of maintenance performed for the plurality of tires;

comparing, by the one or more processors, the first historical inspection data of the tire to the second historical inspection data of the plurality of tires; and inputting, by the one or more processors, based on the comparison, a subset of the second historical inspection data corresponding to the historical inspection data into the machine learning model to output the condition data of the tire.

13. The method of claim 12, wherein the second historical inspection data comprise one or more thresholds associated with the plurality of tire maintenance categories, and wherein the method further comprises:

comparing, by the one or more processors, the one or more values of the tire to the one or more thresholds; and determining, by the one or more processors, based on the comparison between the one or more values and the one or more thresholds and the comparison between the first historical inspection data and the second historical inspection data, the condition data of the tire and the at least one tire maintenance category.

14. The method of claim 10, further comprising:

linking, by the one or more processors, the one or more values comprising the sensor data to the unique identifier associated with the tire; and storing, by the one or more processors, to the tire data structure responsive to linking the sensor data to the unique identifier, an association between the one or more values and the unique identifier.

15. The method of claim 10, further comprising:

receiving, by the one or more processors, from a remote computing device, the historical inspection data via an inspection on the tire; and storing, by the one or more processors, in the tire data structure, an association between the historical inspection data and the unique identifier associated with the tire.

16. The method of claim 10, wherein the at least one tire maintenance category comprises at least one of worn out category, impact damage category, or durability category for performing the type of maintenance for the tire.

17. The method of claim 10, wherein the historical inspection data comprises location data, tire position data, tire structure data, and appearance data, and wherein the sensor data further comprises mechanical data and load data of the tire.

18. The method of claim 17, wherein the mechanical data comprises rotation data of the tire, wherein the load data comprises the pressure data and compression data of the tire, wherein the location data comprises a first coordinate and a second coordinate of the tire on a map, and wherein the tire position data comprises a distance from a center of a wheel to ground and a position equipped on the vehicle.

\* \* \* \* \*